(12) United States Patent
Mason (10) Patent No.: US 8,774,860 B2
(45) Date of Patent: Jul. 8, 2014

(54) METHOD AND DEVICE FOR LOW-POWER FM TRANSMISSION OF AUDIO DATA TO RDS CAPABLE FM RADIO RECEIVER

(75) Inventor: Ken Mason, Fleet (GB)

(73) Assignee: Nokia Corporation, Espoo (FI)

( * ) Notice: Subject to any disclaimer, the term of this patent is extended or adjusted under 35 U.S.C. 154(b) by 732 days.

(21) Appl. No.: 11/887,973

(22) PCT Filed: Aug. 5, 2005

(86) PCT No.: PCT/IB2005/002347
§ 371 (c)(1),
(2), (4) Date: Oct. 4, 2007

(87) PCT Pub. No.: WO2006/106379
PCT Pub. Date: Oct. 12, 2006

(65) Prior Publication Data
US 2009/0054020 A1 Feb. 26, 2009

Related U.S. Application Data

(63) Continuation-in-part of application No. 11/099,981, filed on Apr. 5, 2005, now abandoned.

(51) Int. Cl.
*H04B 15/00* (2006.01)
*H04B 17/00* (2006.01)
*H04M 1/00* (2006.01)

(52) U.S. Cl.
USPC .......................................... 455/556.1; 455/62

(58) Field of Classification Search
CPC ...... H04B 1/034; H04B 10/548; H04B 20/62; H04B 1/3822
USPC ......... 455/418, 425, 450, 41.2, 509, 62, 63.1, 455/67.11, 77, 550.1, 556.1
See application file for complete search history.

(56) References Cited

U.S. PATENT DOCUMENTS 5,970,390 A 10/1999 Koga et al.
(Continued)

FOREIGN PATENT DOCUMENTS

EP 0 845 873 A1 3/1998
(Continued)

OTHER PUBLICATIONS

International Preliminary Report on Patentability issued Oct. 18, 2007 in corresponding International Application No. PCT/IB2005/002347.

(Continued)

*Primary Examiner* — Andrew Wendell
(74) *Attorney, Agent, or Firm* — Alston & Bird LLP (57) ABSTRACT

Method for controlling radio transmission of audio data, wherein audio data from an audio player device is FM-modulated and transmitted to be received by an RDS capable FM radio receiver, comprising selecting at least one frequency, transmitting said selected frequency as Alternate Frequency of the RDS system to be received by said RDS capable FM radio receiver, receiving an input and responsive thereto interrupting said audio transmission, switching to said transmitted frequency, and resuming transmission of said audio data using said transmitted frequency.
It is also provided an electronic device for radio transmission of audio data from an audio player device for being received by an RDS capable FM radio receiver, comprising a controller adapted for selecting at least one FM radio frequency, an audio input interface for receiving audio data from said audio player device, a transmitter adapted for modulating received audio data with FM modulation, and transmitting said FM modulated audio data on a frequency selected by said controller, and an input element for receiving an input, wherein said controller is further adapted for controlling said transmitter to transmit said selected FM radio frequency as Alternate Frequency of the RDS system, detecting an input to said input element and responsive thereto interrupting the transmission of said audio data, switching to said transmitted frequency, and resuming transmission of said audio data using said transmitted frequency.

16 Claims, 3 Drawing Sheets

(56) References Cited

U.S. PATENT DOCUMENTS

| | | | |
|---|---|---|---|
| 5,999,623 | A | 12/1999 | Bowman et al. |
| 6,031,818 | A | 2/2000 | Lo et al. |
| 6,038,434 | A * | 3/2000 | Miyake ..................... 455/186.1 |
| 6,212,175 | B1 | 4/2001 | Harsch |
| 6,487,294 | B1 | 11/2002 | Alexander et al. |
| 6,678,740 | B1 | 1/2004 | Rakib et al. |
| 6,789,196 | B1 | 9/2004 | Miyano et al. |
| 6,934,267 | B1 | 8/2005 | Mannerstråle |
| 6,937,570 | B2 | 8/2005 | Bhatt et al. |
| 7,194,758 | B1 | 3/2007 | Waki et al. |
| 7,209,560 | B1 | 4/2007 | Fairman et al. |
| 2003/0036357 | A1 | 2/2003 | McGowan |
| 2003/0153292 | A1* | 8/2003 | Groeger et al. ............... 455/221 |
| 2003/0236075 | A1 | 12/2003 | Johnson et al. |
| 2004/0038663 | A1* | 2/2004 | Lecomte et al. ............. 455/334 |
| 2004/0078104 | A1 | 4/2004 | Nguyen et al. |
| 2004/0117442 | A1 | 6/2004 | Thielen |
| 2004/0203478 | A1* | 10/2004 | Scott ................................ 455/70 |
| 2004/0267390 | A1 | 12/2004 | Ben-Yaacov et al. |
| 2005/0063556 | A1* | 3/2005 | McEachen et al. ........... 381/104 |
| 2005/0078221 | A1* | 4/2005 | Kobayashi .................... 348/600 |
| 2005/0143139 | A1 | 6/2005 | Park et al. |
| 2005/0272467 | A1* | 12/2005 | Chiu et al. .................. 455/553.1 |
| 2006/0009256 | A1* | 1/2006 | Frank et al. ................. 455/556.1 |
| 2006/0141962 | A1* | 6/2006 | Forbes et al. ............... 455/186.1 |
| 2006/0210037 | A1 | 9/2006 | Olafsson et al. |
| 2006/0223467 | A1 | 10/2006 | Mason |

FOREIGN PATENT DOCUMENTS

| | | |
|---|---|---|
| EP | 0912057 A2 | 4/1999 |
| EP | 1126707 | 8/2001 |
| EP | 1 271 816 A2 | 1/2003 |
| EP | 1 370 053 A1 | 12/2003 |
| GB | 2399719 | 9/2004 |
| GB | 2406488 | 3/2005 |
| WO | 2006106379 | 10/2006 |

OTHER PUBLICATIONS

Chinese Office Action dated Mar. 16, 2011 in parallel Chinese Patent Application No. 200680056457.8 (5 pages) and English translation thereof (5 pages) (10 pages total).
Extended European Search Report from European Application No. 05780475.9, dated Sep. 9, 2010.
Chinese Office Action from Chinese Patent Application No. 200680056457.8, dated Feb. 23, 2012.
Office Action for U.S. Appl. No. 12/516,016 dated Mar. 27, 2012.
Extended European Search Report and Search Opinion for European Application No. 06809026.5 dated Oct. 7, 2011.
Office Action for European Application No. 05780475.9; dated Mar. 26, 2013.
"*Specification of the radio data system (RDS) for VHF/FM sound broadcasting in the frequency range from 87.5 to108.0 MHz;*" European Standard; dated Apr. 1998; retrieved from <http://citesteerx.ist.psu.edu/viewdoc/download?>.

\* cited by examiner

METHOD AND DEVICE FOR LOW-POWER FM TRANSMISSION OF AUDIO DATA TO RDS CAPABLE FM RADIO RECEIVER

CROSS-REFERENCE TO RELATED APPLICATION

This application is the U.S. National Stage of International Application Number PCT/IB2005/002347 filed Aug. 5, 2005 which is a continuation-in-part of U.S. application Ser. No. 11/099,981 filed Apr. 5, 2005.

FIELD OF THE INVENTION

The present invention relates to a method and a device for transmitting audio data from an audio playback device to an RDS capable FM radio receiver. Particularly it relates to transmitting audio data from a mobile playback device to an RDS capable car radio system.

BACKGROUND OF THE INVENTION

Mobile electronic devices which are capable of music playback have become very popular recently, with the IPOD™ by Apple® Computer Inc. being one of the most prominent examples. These music players are mainly intended for being used in conjunction with head- or earphones. For a typical mobile use of such devices this is of course the most preferable listening manner. However these players have become rather sophisticated recently, many of them even comprise hard disks capable of storing gigabytes of music. Therefore it seems only logical that a user would want to use his player, whereon a big amount or even all of his own music is stored, as the source of music data also in other environments, and also for playing back music with normal speakers.

Of course he could simply use the earphone or line out output to connect his player device with his hi-fi equipment or the like. However cable connections are inconvenient, particularly in conjunction with small mobile player devices. Because of the wide variety of used plug/socket connector systems this is also likely to cause incompatibilities between devices.

Another example would be to use such a player as a replacement for a CD-changer in a vehicle. However car radio systems usually do not comprise any input interface to connect a mobile player. As one of the main advantages of mobile music players is the possibility to easily carry it along it would be desirable if it could be coupled with other equipment in a standardized way, with some kind of common interface.

Therefore it is apparent that a wireless transmission of music data from the player is most desirable. As many audio playback devices like stereo systems and car radios comprise an FM tuner or receiver a known implementation of such wireless transmission is to "mimic" the music player as a conventional FM radio station and to send the audio data encoded as a standard FM radio transmission.

In the United States of America (and also other countries) the FCC (Federal Communications Commission) allows the usage of unlicensed (i.e. personal/private) FM-radio transmitters according to FCC rule 15 (see section 15.239). Such a transmitter can thus be used for conveniently transmitting sound or music from any device wirelessly to an FM radio operating in the 88-108 MHz band, e.g. from a CD-player or an MP3-player. This allows listening to music from such a device e.g. through a car FM radio. Due to the restricted transmission power with a field strength of 250 µV/m in a distance of 3 meters the transmission range of such private transmitters is small. Interference is therefore expected to be low. However, interference with licensed FM transmitters, e.g. a radio station, is usually not allowed.

Conventional transmitters for that purpose simply transmit on a fixed frequency or frequency that can manually be chosen. This requires manually setting the corresponding transmission frequency on both the transmitter connected with the player device and the FM radio receiver. As described above an interference with a licensed transmitter is usually not allowed, so the user has to perform a manual search for free frequencies before setting the frequency in order not to violate that regulation. This is of course very inconvenient. Additionally, when the FM receiver is a car radio and the user is driving, the situation related to free frequencies will change over time. This will certainly require re-tuning from time to time, e.g. because a licensed transmitter (e.g. a radio station) will come in range that is transmitting on the same frequency as the unlicensed private transmitter of the user. On the one hand this is normally prohibited as discussed above and should therefore not occur, and on the other hand such interference will most severely decrease the quality of the signal received from the music player, as the transmission power of the private transmitter is substantially lower than that of licensed transmitters. Manual re-tuning will thus be unavoidable to maintain the quality of the transmission of audio data. However manual re-tuning while driving is to be avoided in order not to affect driving safety.

Therefore it is an object of the present invention to provide a method and a device for wirelessly transmitting audio data from an audio playback device to an FM radio receiver, wherein manual re-tuning on the side of the FM radio receiver (and in advanced embodiments even at the transmitter) is not necessary while at the same time the transmission is maintained at the maximum possible quality and is also made more reliable than with the prior art.

The Radio Data System (RDS) is an extension of the standard FM radio transmission. It allows FM broadcasters to send more than just an analog audio signal out over the air interface. Stations can transmit digital RDS data for reception by RDS-equipped FM tuners. This technology opens up a whole new range of services to a listener with RDS reception capability. The RDS system itself is not part of the present invention and shall thus not be described in detail here. Detailed information about the function of RDS can be obtained from many sources.

One special feature of RDS is the so-called Alternate Frequency (AF) function. AF, which should better be referred to as Alternate Frequency Switching, automatically returns an FM tuner to the strongest signal carrying the program a user was originally listening to when the original broadcast got too weak to be received properly. The way this function operates can be summarized as follows:

The original RDS broadcast contains a coded list of all the alternate frequencies carrying the same information, i.e. being used for broadcasting the same program. When the original broadcast fades below a certain threshold the RDS circuitry will search the alternate frequencies for the strongest, most useable signal and automatically switch to it without any action required by the listener.

The most prominent use case is a moving FM radio receiver, e.g. a car stereo system. During driving the moving receiver will occasionally leave a reception area of a certain station/program transmitting on a certain frequency. If that station is part of a network broadcasting the program, with a number of transmitting stations with different geographical location and each with its own frequency for the same program, the AF feature of RDS enables the receiver to tune to the best station for that specific program at all times. That is, the FM tuner is automatically tuned to the frequency of the station providing the best reception of the same program.

SUMMARY OF THE INVENTION

According to the invention a method for radio transmission of audio data from an audio player device for being received by an RDS capable FM radio receiver is provided. The method comprises the steps of
- scanning an FM frequency range to detect available radio frequencies on which no broadcast transmissions or interfering signals are currently received (i.e. no signals having a level above a pre-determined threshold, like e.g. the background noise level);
- storing detected available frequencies;
- selecting one of the stored frequencies;
- receiving audio data from the audio player;
- modulating the received audio data with FM modulation; and
- transmitting the modulated audio data on the selected frequency.

With this method the manual step of finding a free frequency for the transmission is not required anymore. The user simply has to start the initial setup and free frequencies or channels are detected automatically. Also there is the possibility to choose from the stored frequencies according to certain criteria, which will be explained in more detail later on. The selection can either be done manually by the user or automatically as well. Either way the user will have to tune his FM radio to the selected frequency manually at least once.

In an exemplary embodiment the step of scanning the FM frequency range to detect available radio frequencies is repeated. If available frequencies have changed, the stored frequencies are updated accordingly. As the situation related to free frequencies can change during time, particularly within a moving vehicle, it is necessary to update the stored frequencies in order to provide a list of available frequencies at all times. The invention includes different ways of repeating the scanning step, for example a fixed re-scan interval or a scan triggered when certain pre-determined criteria are fulfilled. It is within the scope of the invention to scan only a sub-set of frequencies instead of the whole frequency range, or only to re-scan the stored frequencies. Advantages of performing the scanning in this manner will become apparent in the following description.

In an exemplary embodiment the transmission of the audio data is interrupted while performing the scanning operation. Depending on the specific implementation of a device on which the method of the invention is performed it may be necessary to shut down the transmitter during the scan. If for example an integrated receiver unit is used that can either transmit or receive it is required to shut down the transmitter in order to permit receiving radio signals.

In an exemplary embodiment the method further comprises transmitting at least one of the stored frequencies to be received by the RDS capable FM radio receiver as Alternate Frequency of the RDS system. That is, the Alternate Frequency feature AF of the RDS system is used to provide alternative frequencies to the FM radio receiver. In this manner the FM radio receiver is always provided with at least one alternate frequency. Although the transmitter only transmits on the selected frequency it may be advantageous to provide the alternate frequency even though the presently used frequency is currently available and the radio connection is stable. If a sudden distortion would occur it might be impossible to still transmit on this frequency, such that the FM radio receiver is not able to receive the RDS information containing the alternate frequency. In such a case it would be required to either re-tune the FM radio receiver manually, or wait until the frequency becomes usable again. If at least one alternate frequency is provided at all times, this inconvenience can be avoided. The transmitter can switch to the new frequency and let the FM radio receiver follow on his own. A possible drawback may occur in this manner, namely that the FM radio receiver accidentally changes the frequency to the alternate frequency even though the transmitter continues transmitting on the "old" frequency. Therefore it will depend on the behavior of the corresponding FM radio receiver if performing the inventive method in this manner is advantageous.

In an exemplary embodiment the method further comprises
- interrupting the transmission of said modulated audio data;
- selecting the at least one transmitted Alternate Frequency;
- switching to said selected frequency; and
- resuming transmission of said audio data using said selected frequency.

This embodiment constitutes the basis for different further embodiments. In one variant this enables to occasionally change between frequencies that are in the list of available ones, and then perform the above mentioned re-scanning. Particularly this is necessary in order to check the frequency just left, as detecting the availability of this frequency is impossible while a transmission is simultaneously performed using this frequency. Therefore the transmitter and thus also the transmission have to be shut down during such a check. The check can be made considerably short in duration. However switching the transmission frequency to another of the stored alternative frequencies will usually provide more time for performing the check, as switching between frequencies can be done rather fast, depending on the capabilities of the respective FM radio receiver.

Switching to an alternative frequency can be done on a time-based scale, e.g. every 2 minutes, i.e. without additional trigger events. This enables the above described "background" type of scanning. However the above described embodiment also enables to trigger the switching to another frequency when the presently used frequency becomes unavailable due to a licensed transmission or an interfering signal on the frequency.

In an exemplary embodiment the method further comprises
- detecting if the frequency presently used for transmission is still available; and
- alternatively:
a) if the present frequency is still available, resuming transmission of said audio data on the present frequency;
or
b) if the present frequency is not available anymore
  - selecting the at least one transmitted alternate Frequency;
  - switching to said selected frequency; and
  - resuming transmission of said audio data using said selected frequency.

That is, a switching of the frequency is performed like already described above. The main object of the present invention is to ensure that the audio transmission is both reliable and also compliant to FCC rules. Therefore it is necessary to periodically check if the used frequency is still available, i.e. not occupied by a licensed broadcast or an interfering signal. The check can only be performed when the transmission is interrupted; the reason should be apparent. If the presently used frequency is occupied the transmitter switches to the frequency that has previously been transmitted in the RDS information as "Alternate Frequency". Thus it can be ensured that the radio connection between the audio player device and the FM radio receiver complies to the FCC rules at all times, and is also made more reliable. All this happens, according to the inventive method, in an automatic manner without any user interaction required.

In addition, the exemplary embodiment may further comprise the steps:

interrupting the transmission of the modulated audio data;

detecting if the alternate frequency is still available;

if the alternate frequency is no longer available:

updating the stored list of available frequencies (i.e. removing those from the list which are not available anymore and adding those that have now become available);

selecting another frequency from the list of available frequencies as alternate frequency resuming transmission of the modulated audio data on the used frequency.

These steps are repeated until the availability of a selected alternate frequency has been verified. The verified information on the alternate frequency is then transmitted to the FM receiver through the RDS system.

If the list of available frequencies runs short, that is, the list contains less available frequencies than a predefined threshold, the transmitter performs a new scan for available frequencies at the next opportunity. In addition, the transmitter may perform a scan when the user shows an indication that be does not want to use the audio transmission anymore, e.g. after pressing the "pause" or "stop" button on the device or after switching it off.

In one embodiment it may also be possible to send the AF frequency only when it is detected that the presently used frequency becomes unavailable. "Becoming unavailable" in this conjunction means that it is detected that an interfering signal or incoming licensed transmission comprises a signal level exceeding a certain threshold. It is within the scope of the invention to perform a scan such that is can be detected if the level of such signals is increasing over time, thus indicating that the presently used frequency will become unavailable. An advantage of not providing the FM radio receiver with an AF could be that it is thus not able to change the frequency by itself, but stays tuned to the frequency used by the audio transmission. However this entails the risk that strong distortions that occur may completely block the used frequency. In that case it would not be possible to transmit the AF before the frequency becomes unusable.

In an exemplary embodiment the step of interrupting the transmission of the modulated audio data is preceded by analyzing the audio data to detect the audio volume; and if the volume falls below a pre-determined threshold, performing any of the sequences of before mentioned method steps described above which requires interrupting the audio transmission. Even though the time for interrupting the audio transmission can be made very short so that it will practically not be noticed by the listener in the form of dropouts in the audio playback, it is advantageous to perform necessary interruptions preferably during audio passages with no or at least very low volume, e.g. in a pause between two tracks. When the interruption can be timed such that it is performed in such pauses the listener will not be disturbed.

In an exemplary embodiment the method further comprises receiving information from the audio player device;

reformatting the information into a format used by the Program Service Name function (PS), Program Type Code (PTY) function or Radio Text function (RT) of the RDS system; and transmitting the reformatted information to be received by the RDS capable FM radio receiver.

Mobile audio players and similar devices usually provide many additional information apart from the pure audio signal. Track title, track time played/remaining and other information enhance user comfort substantially. Thus it is advantageous to display this information also on the FM radio receiver. Different features of the RDS system can be utilized for that purpose. For example the Program Service Name (PS) function could be used to display an identification of the mobile player device like "Till's MP3 player", similar to the station name of a conventional radio broadcast. Track related information can be displayed with the Radio Text (RT) function. As many mp3 files contain a data field indicating the musical genre this may also be displayed through the Program Type. Code (PTY) function, like Rock, Pop, Jazz etc.

In order to have the FM radio receiver display such information it must usually be reformatted into the specific RDS format (e.g. PS field only enables to use 8 digits at a time). A kind of conversion according to this embodiment is thus useful to enhance user comfort. Even more advanced features may be incorporated in this manner. That is, much additional information can be relayed to the FM radio receiver. For example the audio player could indicate that the internal battery is running out and a corresponding warning could then be displayed on the car radio or like. Or a warning message like "no free frequencies found!" could be displayed. For the artisan many similar uses enabled by this feature should be apparent.

In an exemplary embodiment the RDS Program Identification Code (PI) is used for detecting if a frequency is being used for broadcast transmissions. As a main object of the invention is not to interfere with licensed broadcasts it is advantageous to use the PI code transmitted by transmitters as conventional radio stations to decide if a signal received belongs to a licensed broadcast. If no PI code is received this indicates that the signal is not licensed and must thus not be treated in the same manner as a legal licensed broadcast which is not to be interfered with according to FCC. Also this can avoid using complex techniques to decide about a certain signal if a PI code can simply be identified.

According to an aspect of the invention a method for controlling radio transmission of audio data is provided, wherein audio data from an audio player device is modulated by FM-modulation and transmitted to be received by an RDS capable FM radio receiver. The method comprises selecting at least one frequency;

transmitting said selected frequency as Alternate Frequency of the RDS system to be received by said RDS capable FM radio receiver;

receiving an input and responsive thereto interrupting said audio transmission;

switching to said transmitted frequency; and resuming transmission of said audio data using said transmitted frequency.

This embodiment is a kind of semi-manual alternative. In this embodiment the selection of a suitable frequency is automatically done on the side of the FM radio receiver, similar to the preceding embodiments. However, the selection on the side of the transmitter is only semi-automatic. Changing the frequency has to be "triggered" by an input. This enables a very simple implementation of the invention, while still maintaining improved user comfort, as his FM radio receiver will automatically tune to the right frequency.

It is to be noted that there are two alternatives with respect to this method, which are covered by this embodiment. In a first alternative the transmitter already transmits an alternate frequency and only upon an input, that is, a kind of "trigger signal", it stops transmission on the currently used frequency, switches to the new frequency and resumes transmission on this new frequency.

In a second alternative the transmitter starts transmitting the alternate frequency after reception of the "trigger signal", and some time later (a time span which is chosen such that the receiver most probably will have been able to receive the transmitted alternate frequency) stops transmission on the currently used frequency and resumes transmission on the alternate frequency.

In an exemplary embodiment the input is an input received from a user, that is, the frequency change is triggered by a user in a manual way. In other embodiments it can also be an input not (or at least not directly) caused by a user, that is, be initiated by another external event than a user input.

In an exemplary embodiment the frequency is selected from FM radio frequencies on the base of a random function. Randomly choosing between all possible FM radio frequencies, that is, e.g. 88-108 MHz, is an easy way to implement a selection method.

Naturally, it is also within the concept of the invention to use even simpler functions, like going through all frequencies in an ascending/descending order, and also to use various increments of such frequency changes, like 0.1 MHz or others.

In an exemplary embodiment, the method further comprises storing a list comprising at least two frequencies, wherein said frequency is selected from said list. This enables a device manufacturer to pre-program certain frequencies, e.g. such that are known to be used only rarely. Naturally the list can also be entered manually by a user, e.g. on first initialization of a device operating according to the inventive method.

The list can also be compiled according to location information and a data-base which contains licensed transmitter stations and their locations. Such a location-specific list could also be downloaded from a server (e.g. by a mobile cellular data connection), after a request containing the location information of a user and his vehicle (either GPS location or the cell information from the cellular network). It can also be learnt by the device (e.g. all frequencies formerly used with this device, sorted in descending order according to the listening time, with that frequency on top of the list that was used for the longest time).

In an exemplary embodiment the frequency is selected according to said user input. Here the user does not only trigger the frequency change, he actively indicates a certain preference for this change. That is, the user can e.g. input a desired frequency directly. Or he can indicate to use a higher/lower frequency or like.

In an exemplary embodiment the method further comprises
  receiving information from said audio player device;
  reformatting said information into a format used by the Program Service Name function (PS), Program Type Code (PTY) function or Radio Text function (RT) of the RDS system; and
  transmitting said reformatted information to be received by said RDS capable FM radio receiver.

According to another aspect of the present invention a computer program product is provided, comprising program code means stored on a computer readable medium for carrying out the method of the invention when the program product is run on a computer or network device.

According to yet another aspect of the present invention an electronic device for radio transmission of audio data from an audio player device for being received by an RDS capable FM radio receiver is provided. The device comprises
  a receiver adapted for scanning an FM frequency range to detect available radio frequencies on which no broadcast transmissions or interfering signals are currently received (i.e. no signals having a level above a predetermined threshold, like e.g. the background noise level);
  a memory device for storing detected available frequencies;
  a controller adapted for selecting one of the stored frequencies;
  an audio input interface for receiving audio data from the audio player device; and
  a transmitter adapted for
  modulating received audio data with FM modulation; and
  transmitting the FM modulated audio data on a frequency selected by the controller.

Such a device according to the invention enables to perform the methods described above. Possible implementations of the components will be explained in more detail when describing the figures. The controller can for example be set up such that preferably the last used frequency is used in order to avoid re-tuning of the FM radio receiver. The object of the receiver is mainly carrier detection rather than FM audio reception, therefore certain optimizations are required for enhancing the sensitivity rather than reception quality of audio. DSP techniques may also be used for this enhancement. However the receiver can also be enabled to perform the function of FM reception, as the narrow-band carrier detection mode may be just a special mode of the receiver. This particularly concerns devices having an integrated FM radio which can additionally be used as a receiver according to the present invention.

In an exemplary embodiment the controller is further adapted for
  controlling the receiver for repeating the scanning of the FM frequency range to detect available radio frequencies; and
  if available frequencies have changed, updating the stored frequencies accordingly. As the situation related to free frequencies can change during time, particularly within a moving vehicle, it is necessary to update the stored frequencies in order to provide a list of available frequencies at all times. The controller can be set up for performing a repetition of the scanning step in different ways, for example using a fixed re-scan interval. A scan can as well be triggered when certain pre-determined criteria are fulfilled. It is within the scope of the invention to scan only a sub-set of frequencies instead of the whole frequency range, or only to re-scan the stored frequencies. As scanning takes up time, and it desirable to keep scanning time at a possible minimum it may be advantageous to set up the controller only to scan an increment of the whole range at a time, and further increments in subsequent scanning operations.

In an exemplary embodiment the controller is further adapted for controlling the transmitter to interrupt the transmission of the audio data, e.g. while the receiver is performing the scanning operation. Advantages of such operation have been described above.

In an exemplary embodiment the controller is further adapted for
controlling said transmitter to transmit at least one of said stored frequencies as Alternate Frequency of the RDS system.

This function is required for the advanced features of the invention in conjunction with re-tuning. As described above in connection with the method of the invention sending the Alternate Frequency can be triggered in different ways.

In an exemplary embodiment the inventive device further comprises
an analyzer component adapted for analyzing the audio data to detect the audio volume and indicating to the controller when the volume falls below a pre-determined threshold.

That way the controller is enabled to trigger re-scanning operations or other actions requiring an interruption of the audio transmission only when they are likely to pass unnoticed by a listener.

In an exemplary embodiment the receiver and the transmitter are integrated into a transceiver unit. While this may entail certain technical drawbacks it can help to reduce circuit area and also manufacturing costs.

In an exemplary embodiment the inventive device further comprises
an information interface for receiving information from the audio player device; and
a reformatting component for reformatting the information into a format used by the Program Service Name (PS) function, Program Type Code (PTY) function or Radio Text (RT) function of the RDS system;
wherein
the transmitter is further adapted for transmitting the reformatted information to be received by the RDS capable FM radio receiver. Advantages of such operation have been described above. Depending on the type of controller used in such a device this reformatting component can be integrated into the controller.

In an exemplary embodiment the receiver is adapted to use the RDS Program Identification Code (PI) for detecting if a frequency is being used for licensed broadcast transmissions. That is a simple way to make use of this feature of RDS, in order to avoid complex signal detection schemes that might be required otherwise to detect licensed legal broadcasts. Instead of developing corresponding circuitry, standard components used for RDS transmitters or at least their layout might be used. If a PI code is received the corresponding licensed broadcast can easily be identified, and if no PI code is received it can be concluded that the corresponding broadcast is no licensed broadcast.

According to an aspect of the invention an electronic device for radio transmission of audio data from an audio player device for being received by an RDS capable FM radio receiver is provided, the device comprising:
a controller adapted for selecting at least one FM radio frequency;
an audio input interface for receiving audio data from said audio player device;
a transmitter adapted for
modulating received audio data with FM modulation; and
transmitting said FM modulated audio data on a frequency selected by said controller;
and
an input element for receiving an input;
wherein said controller is further adapted for
controlling said transmitter to
transmit said selected FM radio frequency as Alternate Frequency of the RDS system;
detecting an input to said input element and responsive thereto
interrupting the transmission of said audio data;
switching to said transmitted frequency; and
resuming transmission of said audio data using said transmitted frequency.

In an exemplary embodiment the input element is user-operable.

In an exemplary embodiment the controller is further adapted for selecting said frequency from FM radio frequencies on the basis of a random function.

In an exemplary embodiment the device further comprises a memory device for storing a list comprising at least two FM radio frequencies; and the controller is further adapted to select the frequency from said list.

In an exemplary embodiment the controller is further adapted to select said frequency based on said input.

In an exemplary embodiment the device further comprises:
an information interface for receiving information from said audio player device; and
a reformatting component adapted for reformatting said information into a format used by the Program Service Name (PS) function, Program Type Code (PTY) function or Radio Text (RT) function of the RDS system;
wherein said transmitter is further adapted for transmitting said reformatted information to be received by said RDS capable FM radio receiver.

According to still another aspect of the present invention an audio player device is provided, comprising a device according to the above described implementations. Although it is possible within the scope of the invention to use an external module for the audio transmission that can be connected with an existing audio player there are certain advantages that can be achieved with a device having such a module built in. The advantages should mostly be apparent to an artisan. One possible advantage is, for example, the use of an integrated module performing the FM modulation not from analog audio data but from digital, possibly compressed audio data. This can help to reduce the quality loss that is in principle unavoidable due to the FM modulation of already processed audio data. Also e.g. the information interface is easier to implement within such a player having a module according to the invention.

BRIEF DESCRIPTION OF THE DRAWINGS

The invention may be better understood by referring to the attached drawings, which are solely provided as illustrative examples of possible embodiments of the present invention, and in which.

DETAILED DESCRIPTION OF THE INVENTION

Figure 1:
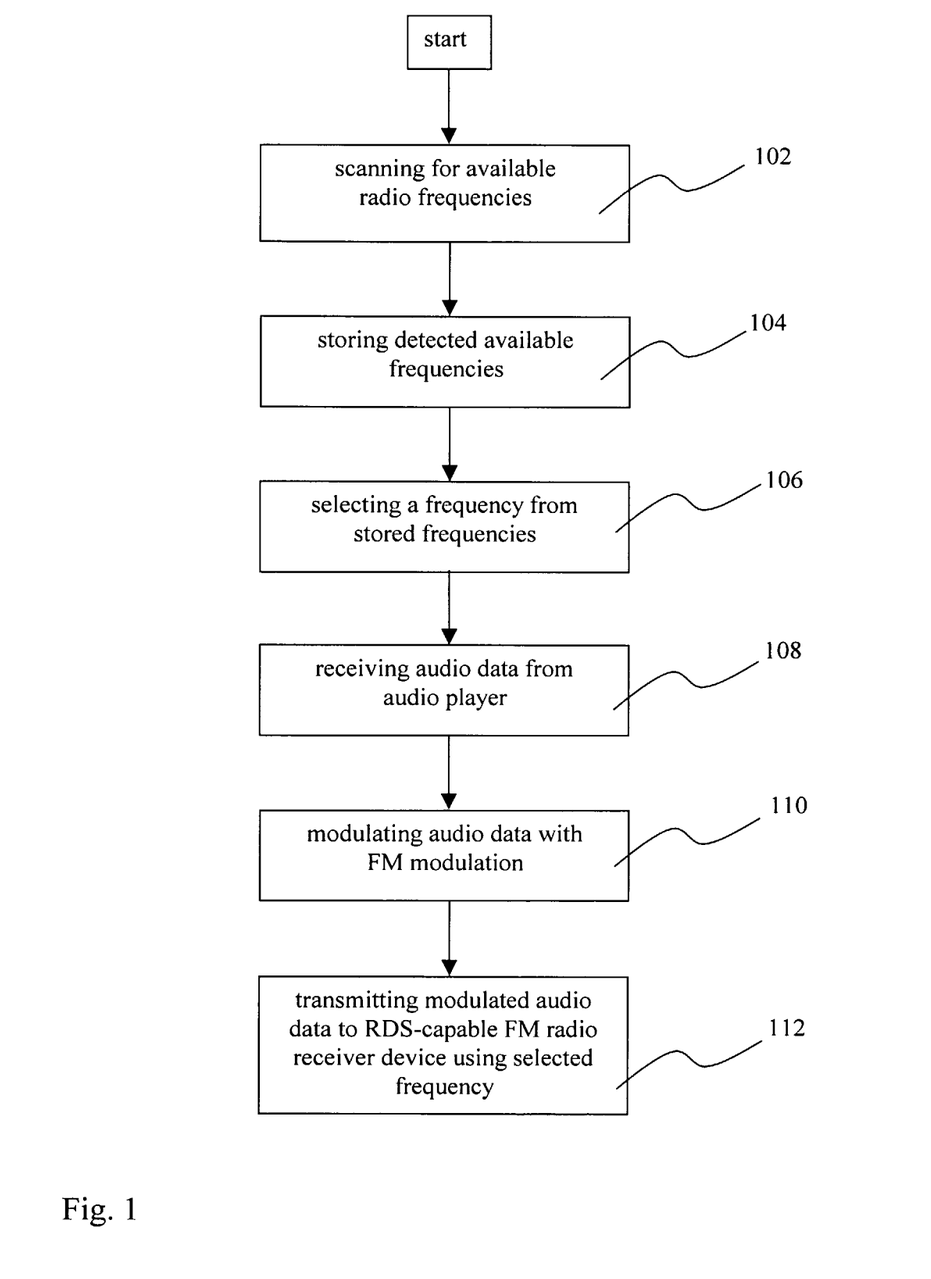
FIG. 1 shows a flow diagram of an embodiment of the method according to the invention.

FIG. 1 shows the steps of an example embodiment of the method according to the invention. In step 102 the respective frequency range (e.g. 88-108 MHz for FM radio) is scanned to detect available frequencies. Available is particularly to be understood as such frequencies which are not used for a licensed broadcast (e.g. a radio station program), which is not to be interfered with according to FCC. However it is also possible to rule out such frequencies on which other signals are received which may cause disturbances, such as other unlicensed transmissions or interfering signals. As such frequencies might not be suitable for the audio transmission they should be excluded. In one embodiment of the invention the Program Identification Code (PI) of the RDS system is evaluated to determine if a received signal on a scanned frequency belongs to a licensed broadcast. If such a PI code is received it can be verified if the sender is associated with a licensed legal broadcast.

The frequencies, that are considered to be available for the transmission, are then stored in step 104. If there are no available frequencies found at this point an error message can be outputted. For the following steps it is assumed that at least two frequencies are found to be available. In step 106 one of those at least two frequencies is selected for the intended audio transmission. The selection may be based on various parameters, depending on the particular situation. For example, if—in an earlier connection between the audio player and the FM radio receiver—the user has already stored a specific frequency as a preset in his car radio or like, it would be advantageous to re-use this frequency for convenience. Thus, if this frequency is still available one possible selection criterion could be to favor the last used frequency. In an advanced embodiment of the invention it could be possible to store the found available frequencies together with an indicator of the channel quality, e.g. how strong background signals are on this frequency, and then preferably choose the one with the highest expected quality. Other criteria should be apparent to an artisan.

In step 108 the audio data are received which are to be transmitted. Within the concept of the invention this includes receiving the audio data through an external interface from an external audio player device such as an MP3 player, e.g. through a conventional cable connection or a suitable wireless link. This belongs to the case in which the transmission device according to the invention is a separate device or module which is connectable to an audio player device. However it is also possible to have a player device with a corresponding built-in transmission module, and in this case the audio data will be received through an internal interface located inside the player device. Also the invention includes receiving the audio data in various common formats, both digital and analog, and also in compressed formats like MP3 or the like as well as uncompressed audio data.

In step 110 the received audio data are FM-modulated according to a standard FM radio broadcast. Depending on the source format of the audio data this may require an intermediate decoding step performed with known techniques in order to transform the audio data into a format being suited for being subjected to a standard FM modulation. For example in case an external audio player is used with a separate transmission module this module will usually be connected to a headphone or line-out output of the player device, this output providing standard analog stereo signals. However in case the transmission module is built into a player device suitable decoding steps might be required, which can be performed according to known techniques.

In step 112 the FM-modulated audio data are sent to the RDS capable FM radio receiver, using the frequency that was selected before. This step concludes the description of the basic operation of the inventive method. The major advantage lies in the fact that any RDS capable FM radio receiver can be used to play back the audio originating from the audio player device. However there are even more advantages provided by the method according to the invention which will become apparent from the further description.

The basic operation method just described already provides the advantage that the user is not forced to search for suitable available frequencies in a manual way. This can be troublesome and inconvenient. With the present invention this step can be performed automatically when first initiating the audio transmission, and a free frequency will then be found faster and in a far more comfortable way for the user. In principle until now the FM radio receiver could be of a simple type. However the more advanced features of the present invention make use of the enhanced capabilities provided by an FM radio receiver being capable to handle the Radio Data System (RDS).

Figure 2:
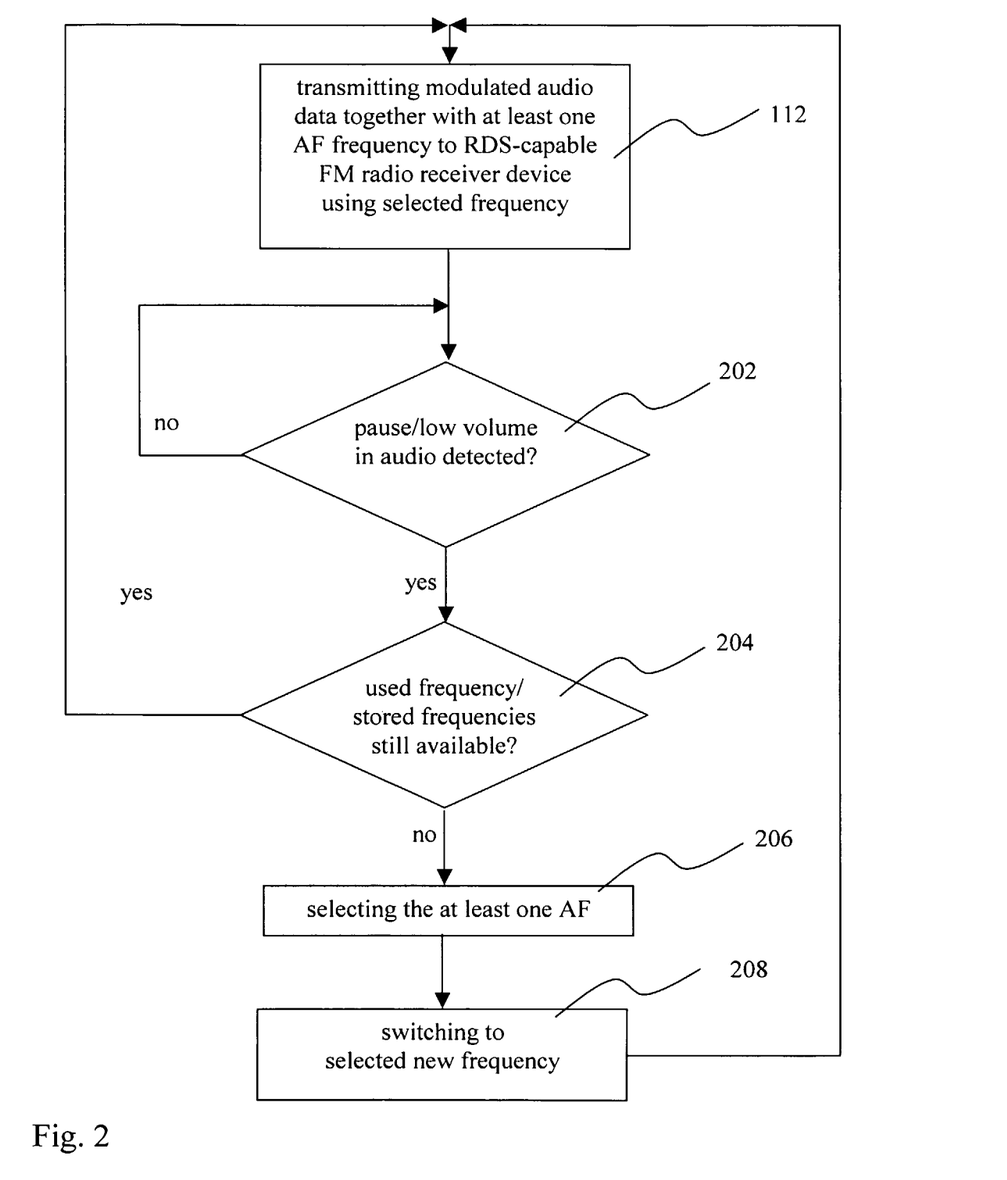
FIG. 2 shows a flow diagram of further steps of another embodiment of the method according to the invention.

FIG. 2 shows further steps of the method of the invention. The steps shown here continue the basic steps described in conjunction with FIG. 1. The transmission of the modulated audio data is performed in step 112 as in FIG. 1. At least one AF frequency is transmitted as well in step 112 (in another embodiment this part of this step can be omitted, as described later). In regular intervals it is detected, in step 202, if there is a pause or a low volume passage in the audio. If there is no such passage transmission is continued and the detection is repeated. If a pause or like is found in the audio it is checked, in step 204, if the presently used frequency is still available, i.e. not used by another transmitter. Step 204 may also include checking all the other frequencies stored in the initial scanning step described in FIG. 1. In the latter case step 204 may also include updating the stored frequency list in case there are changes detected.

If the presently used frequency is still free the transmission (step 112) of the audio data is continued on this frequency. However if the frequency is found to be occupied by a licensed transmitter or an interfering signal is detected on that frequency, a new frequency is selected from the stored frequencies (step 206); in the embodiment depicted here this frequency is one of the at least one AF frequencies transmitted in step 112. In another embodiment this frequency is transmitted to the FM radio receiver as an Alternate Frequency according to the AF function of RDS only after selecting a new one, instead of the manner described above. In that other embodiment transmitting should of course be continued until the FM radio receiver most probably has received the alternate frequency. In step 208 the transmitter then switches to the newly selected frequency and continues transmission of the audio data on that frequency. The FM radio receiver will follow according to the AF function and tune to that frequency such that the audio playback can continue.

Figure 3:
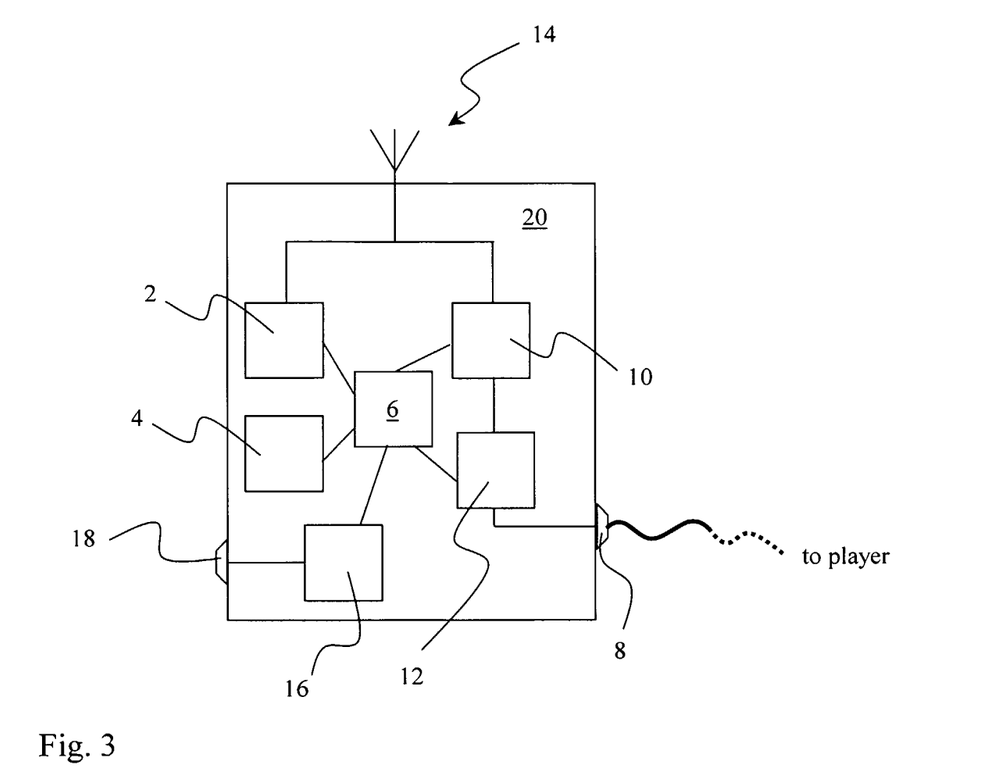
FIG. 3 shows a schematic view of an embodiment of a device according to the invention.

FIG. 3 shows components of a device 20 according to the invention. A receiver component 2 is connected with an antenna 14, the receiver 2 being adapted for scanning the FM frequency range in order to detect frequencies which are available. Available within the concept of the present invention means that no licensed transmitter is broadcasting on the frequency, and also that no other interfering signal is detected. A memory device 4 is provided for storing the found available frequencies. A main controller unit 6 is provided for selecting from these stored frequencies. An audio interface 8 receives audio data from an audio player device (not shown). It should be noted that, although this interface is shown here as a connection to an external player device it can of course also be implemented as an internal interface. The latter relates mainly to the case wherein the device according to the invention is incorporated into a music player or like. The received audio data are sent to a transmitter component 10, the transmitter 10 being adapted for performing an FM modulation of the audio data according to known techniques. It is further adapted for sending out the modulated audio data using the antenna 14 on a frequency selected by the controller 6.

An advanced feature of the invention is also shown here. An information interface 18 is provided, for receiving information from the audio player device. Similarly to the audio interface 8 this may, other as depicted here, also be implemented as an internal interface when the inventive device is a module built into an audio player. Also it can be a wired as well as a wireless interface, e.g. Bluetooth. The information interface is adapted to receive certain playback related information from the player device, e.g. track title, track time, music genre, music player identification etc. These data are relayed to a reformatting component 16 which is adapted to reformat the information to be used by the RDS functions PTY, PS or RT. In this context the track title could for example be reformatted into a RT Radio Text format, the genre could be transformed into a PTY indication, and an identification of the audio player (like "Tills MP3 player") could be displayed as the PS information.

Further an analyzer component 12 is shown in this figure, which is adapted to analyze the received audio data to detect pauses or passages with low volume. If such sections are detected the analyzer 12 can indicate this occurrence to the controller 6, which in turn can trigger a frequency check operation with the receiver 2. That is, to detect if a presently used frequency is still available.

It should be noted that receiver 2 and transmitter 10 may either be separate components as depicted here, or may as well be respective sections of an integrated transceiver unit.

While the invention is not limited to be used in conjunction with a car radio system it provides specific advantages in such an environment. The vehicle a car radio system is installed in will usually travel through areas with somehow different reception conditions. That is, the car radio will occasionally leave the coverage range of radio programs or radio stations and/or enter the coverage range of others. Therefore the situation related to available frequencies is constantly changing over time when traveling. As already discussed earlier the private FM transmission used by the present invention is in principle allowed by the FCC. However one limitation is that an unlicensed transmitter is not to interfere with a broadcast of any licensed transmitter. Therefore it is one major object of the invention to avoid the occurrence of such interferences. As the private transmitter has a very limited power output it is also very likely that attempting to transmit on a frequency used by a much stronger licensed transmitter will not provide a satisfactory audio quality in the FM radio receiver. Transmitting only on frequencies not occupied by licensed broadcasts is thus both legally required as well as required to ensure the quality of the audio playback.

A somehow similar problem is that also other transmissions or interfering signals not originating from licensed transmitters may cause disturbances severely reducing the audio transmission quality, or even block the transmission altogether. As such signals and transmissions are also likely to change when traveling it is also an object of the invention to maintain the maximum quality of the audio transmission even under such changing conditions.

The objects just mentioned above can be solved according to the invention by making use of features of the RDS system. Conventionally the user is required to monitor manually if his personal unlicensed transmitter, which is set to a certain frequency, will interfere with a licensed broadcast in order not to violate the FCC regulation. In case the manually selected transmission frequency becomes unusable for the audio transmission due to disturbances he is further forced to manually re-tune both the FM radio receiver and the personal transmitter. This can cause distractions when driving which may severely endanger driving safety.

The present invention in contrast enables automatic re-tuning which solves these problems. The receiver of the device according to the invention occasionally detects if the present frequency used for transmission is still available, i.e. if the transmission is not likely to interfere with licensed broadcasts as well as being disturbed by other interfering signals. In case the presently used frequency becomes unusable for the transmission due to such reasons, an automatic switching is enabled.

It is within the scope of the present invention to use a separate transmitter and receiver as well as using an integrated transceiver unit. Providing two separate units as receiver and transmitter can be advantageous as those two units have different objects. The main object of the receiver is to scan a given frequency range to reliably detect available frequencies, i.e. also to rule out that even a signal with rather low level is present which could indicate that a licensed broadcast is using that frequency. Therefore it is optimized for that specific purpose—carrier detection—mainly, while a good audio quality of a received radio program is irrelevant. This is in contrast to a "real" FM radio receiver which shall mainly provide a good reception quality, good audio quality and low noise level etc., while it is not particularly necessary to properly receive even very weak radio broadcasts. However it should be noted that the narrow-band reception mode for carrier detection can also be only one specific mode of the receiver. It can still comprise at least another mode optimized for good FM audio reception, e.g. in case a device according to the invention is further equipped with conventional FM audio reception capabilities.

The object of the transmitter in a device according to the present invention is of course also different from that of the receiver. Here a high audio quality is the main optimization goal, to ensure the best listening experience to the user of the inventive device. This involves providing the highest possible signal quality, as well as the best achievable output signal strength, given the limitations of the output power according to FCC.

It is therefore apparent that these different objects of transmitter and receiver may advantageously be achieved through separate devices or circuits, while optimizing the respective sections of an integrated transceiver may be more difficult in certain cases. However providing only one circuit fulfilling both objects can help to reduce manufacturing costs as well as circuit area, though probably requiring a more intricate circuit development process or accepting certain compromises in transmitter/receiver properties.

However, apart from optimization there is one additional advantage that may be achieved with separate transmitter/receiver. If the receiver can be operated independently from the transmitter it is possible to perform the scanning for available frequencies in a kind of "background" mode, without interrupting the transmission of the FM audio signal. That way it is easier to keep track of changes in free frequencies, although it is naturally not possible to detect if the presently selected transmission frequency is still not used by other transmitters, as long as the audio transmission is maintained. As scanning the whole frequency range will take up much more time than just checking if the presently used frequency is still free, this can still provide for a more robust transmission as the stored alternative frequencies can be kept up to date.

For checking if the presently used frequency is still free it will in every circumstance be necessary to shortly interrupt the audio transmission. When such an interruption occurs within an audio track it might be noticed by the listener, which of course should be avoided. The above mentioned "background" scanning for free frequencies can thus help to reduce the necessary time for such interruption substantially, as only one frequency must be checked. In contrast without background scanning it might occur that a new detection for free frequencies is necessary, e.g. if none of the stored frequencies is available anymore for transmission. Due to this another desired property of the receiver should be that detecting free frequencies, or if the presently used frequency is still available for transmission, can be performed as fast as possible.

In conjunction with the use of background scanning another possibility to achieve the object of the invention is to use a kind of "frequency hopping" scheme. As the list of alternate frequencies is regularly updated using the background scanning it is possible to switch to other free frequencies occasionally. The frequency just left can then again be included in the background scan to be checked as it is no longer blocked for such check by the audio transmission. Using such a scheme ensures that the switching times to other frequencies can be kept minimal, and provides a very robust transmission as well.

As discussed above it will not be possible to completely avoid interrupting the audio transmission altogether for the frequency checks. Therefore the main object associated with this interruption is to make it as little noticeable to the listener as possible. When playing back music there are positions in a track when the interruption may pass unnoticed by a listener: silent passages or such with very low volume, including passages between two tracks. Therefore in embodiments of the present invention the transmitted audio data are analyzed in order to detect passages within an audio track where the interruption is not or at least hardly noticeable, i.e. by finding low or no volume sections, or even using psycho-acoustic methods or signal processing methods like analysis of the audio spectrum for detecting sections wherein an interruption is less annoying to a user. It is also within the scope of the present invention to actively control the player device to "hide" the interruption, e.g. to delay starting the next track until the interruption has been performed.

The main feature of the present invention is to use RDS to control the transmitter such that only free channels are used. These are channels that are free from legal (licensed) broadcast transmission, and preferably also free from other signals which might distort or block the audio transmission.

The method of the invention performs this according to the following basic steps:

Initially the receiver scans the respective frequency range to find available frequencies that are not used for licensed broadcasts The free frequencies that are found are stored, and either the device according to the invention automatically selects one for transmission, or the user manually selects one Now the user has to tune the FM radio receiver, e.g. his car radio, to the selected frequency and activate the Alternate Frequency function of RDS. This frequency may be stored in the car radio as a preset. Thus it is possible that the next time the receiver scans for free frequencies and selects one this preset frequency is favoured in the selection process, in order to re-use the stored preset in the car radio. If the corresponding frequency is still available this can help to avoid initial re-tuning of the FM radio receiver.

Now the transmitter is activated and the audio data from the audio player are transmitted to the FM radio receiver in form of an FM broadcast like that of a normal radio station.

A main advantage of this method is that this happens completely transparent from the FM radio receiver's point of view. The car radio or other FM radio receiver will treat the transmission from the audio player as if it were a normal FM radio broadcast. Thus no changes to the car radio are required, and every RDS capable FM receiver can play back the transmitted audio.

The method according to the invention may further comprise the following steps:

The transmitter is periodically switched of, such that the receiver is enabled to monitor the background level of emissions and to check if the used frequency is still available (i.e. if no licensed or other broadcast uses the frequency). Within the concept of the present invention this may be performed in a regular order, i.e. every x seconds, or be triggered in a manner to be described later on, or in any other suitable way, e.g. on a random basis. It should be noted that within the concept of this invention there may be defined a threshold for signal levels, wherein only those received signals are treated as a broadcast which have a level above this threshold. As there will always be some background (noise) level present this is necessary to decide if a signal is received. The phrase "no broadcast transmissions or interfering signals are currently received" is therefore to be understood in that manner.

If the background level is deemed excessive, e.g. because some other unlicensed transmitter or some other source is causing a distortion on the frequency, or if the frequency is now occupied by a licensed broadcast another one of the stored frequencies is selected. This frequency is then sent to the FM radio receiver indicating the newly selected frequency as an alternate frequency according to the Alternate Frequency (AF) function of the RDS system. The transmission can be maintained for a reasonable time such that it is ensured the FM radio receiver correctly received the new frequency.

The transmitter then stops the transmission on the original frequency and switches to the newly selected frequency to resume the transmission of the audio. The RDS capable FM radio receiver now switches to the new frequency (if the AF feature is activated).

By using the method described above the present invention provides a more stable connection between the transmitting (audio player) and the receiving device (car radio etc.). Furthermore the requirements of the FCC concerning not interfering with legal, licensed broadcasts can easily be fulfilled. Re-tuning is done completely automatically and in a manner transparent for the FM radio receiver, eliminating the necessity for manual re-tuning by the user. The present invention is not limited to be used in conjunction with a car stereo system. However particularly for the driver of a vehicle it is advantageous that re-tuning is performed automatically, thus ensuring the driver is not distracted in order not to affect driving safety.

In a situation where two devices according to the invention are used to share music, the sharing (i.e. transmitting) device could utilize RDS (using some proprietary coding scheme) to request the receiving device to perform a scan and report back the clear channels.

The Alternate Frequency function of RDS uses the Program Identification (PI) code to determine which program is actually received. This code is a unique code identifying a certain transmitter, e.g. radio station. Within the concept of the present invention it is possible to "hardcode" such PI code into the transmitter of a device according to the invention. However there are also other ways of deriving the PI code, e.g. using the IMEI of a mobile device equipped with a device according to the invention. It should just be ensured that the PI code is in every case unique and does not collide with a PI code allocated to a licensed broadcast station.

The method and device according to the present invention helps to reduce the occurrence of low power transmitters clashing on the same frequencies (in urban areas the number of free channels could be low).

In the following a possible operation process of a device according to the present invention will be described:

The user initiates the transmission mode.

The controller puts the receiver or the receiver part of the integrated transceiver into receive mode and automatically scans the respective frequency band. A list of found available frequencies is then presented to the user, preferably on some kind of display. If no available frequency can be found an error message can be presented.

The user selects one of these frequencies, for example by scrolling, highlighting and entering on a key pad being provided on the device, or using some other suitable input device.

The user is prompted to tune his FM radio receiver to the selected frequency. It is advisable that the user presets the stored frequency on the FM radio receiver as this will store the transmitter's unique PI code. The PI code can be hardwired within the device, but the invention is not limited thereto. The PI could for example be generated from the International Mobile Equipment Identification IMEI (in some coded way), so that each phone will have a unique PI.

At this point the user could also be prompted to enable the Alternate Frequency (AF) mode of operation on his FM radio receiver.

Now the device activates the transmitter and starts transmitting the audio signal.

The device of the invention basically operates in one of three different modes:

(1) Monitor Mode

The device periodically switches to narrow band receiver mode. That is, in case an integrated transceiver unit is used the transmitting section is de-activated and the receiving section is activated instead. The switching point could be linked to audio pauses so as to be less intrusive to the user. In this mode the receiver is a carrier detector and it basically detects the presence of a signal in the receive channel. It could also periodically check the signal strength of free channels it listed in the initialization phase. This can, with separate transmitter/receiver, also be accomplished during the audio transmission in a kind of background scanning mode.

During this mode of operation the transmitter should be sending regular PI (Program Identification) and could use the PS Field (or RT) to display the MP3 track being played or other playback related additional information (track time and the like).

(2) Detection

If the receiver detects (after a suitable number of averages) a high level of interference on the channel, due to a licensed broadcast transmitting on the frequency or other interfering signal, then it transmits one of the AF frequencies in its list using the standard RDS AF function. In other embodiments one or more AF frequencies are transmitted continuously, then this step can be omitted here.

The FM radio receiver may well check the AF frequency for signal strength but because there is no signal it will remain on the wanted one.

(3) AF Switch

The sender will now switch to the AF frequency. This should cause the radio receiver to enter the AF mode because it can no longer detect the presence of the matching PI code. The radio receiver should check the AF frequency and find the sender already there broadcasting the correct PI code. It should then unmute the audio and the system returns to monitor mode.

While the invention has mainly been described in the combination of a mobile music player and a car FM radio receiver it is not limited to this particular combination. For the artisan many other useful combinations should be apparent, just as an example a mobile music player could be used to play back music through the fixed FM radio receiver in the living room, the bathroom, the kitchen or elsewhere. Or just the other way around a fixed CD-player in the living-room can, if equipped with a device according to the invention, be used to provide music to a portable FM radio receiver to be used in the garden of the house.

The invention claimed is:

1. A method performed by an apparatus, comprising:
scanning a frequency range to detect available radio frequencies on which no broadcast transmissions or interfering signals are currently received;
storing detected available frequencies;
selecting one of said stored frequencies;
receiving audio data from an audio player;
analyzing said audio data received from said audio player device to detect an audio volume;
modulating said received audio data with frequency modulation;
transmitting frequency modulated audio data on said selected frequency;
interrupting the transmitting of said frequency modulated audio data, wherein said interrupting is performed if said audio volume falls below a pre-determined threshold;
detecting if the frequency presently used for said transmitting is still available; and alternatively
if the frequency presently used is still available, resuming said transmitting of said audio data on the frequency presently used;
or
if the frequency presently used is not available anymore selecting the at least one alternative frequency;
switching to said selected alternative frequency; and
resuming said transmitting of said audio data using said selected alternative frequency.

2. A method according to claim 1, further comprising:
repeating said step of scanning said frequency range to detect available radio frequencies; and
updating said stored frequencies accordingly if available frequencies have changed.

3. A method according to claim 2, wherein said transmitting of said frequency modulated audio data is interrupted while performing said scanning operation.

4. A method according to claim 1, further comprising:
receiving information from said audio player device;
reformatting said information into a format used by a program service name function, program type code function or radio text function of said radio data system; and transmitting said reformatted information to be received by said radio data system capable radio receiver.

5. A method according to claim 1, wherein a radio data system program identification code is used for detecting if a frequency is being used for licensed broadcast transmissions.

6. A non-transitory computer readable medium comprising program code for carrying out the method of claim 1 when said program product is run on a computer or network device.

7. A method according to claim 1, further comprising:
interrupting the transmitting of said frequency modulated audio data on said selected frequency;
selecting the at least one transmitted alternative frequency;
switching to said selected alternative frequency; and
resuming said transmitting of said frequency modulated audio data on said selected alternative frequency.

8. A method according to claim 1, further comprising:
transmitting at least one of said stored frequencies as an alternative frequency of the radio data system based on National Radio Systems Committee United States Radio Broadcast Data System (RBDS) Standard on said selected frequency.

9. An apparatus, comprising:
a receiver adapted for scanning a frequency range to detect available radio frequencies on which no broadcast transmissions or interfering signals are currently received;
a memory device for storing detected available frequencies;
a controller adapted for selecting one of said stored frequencies;
an audio input interface for receiving audio data from an audio player device;
an analyzer component adapted for analyzing said audio data received from said audio player device to detect an audio volume and indicating to said controller when said audio volume falls below a pre-determined threshold to enable the controller to interrupt the transmitting of said audio data in response thereto; and
a transmitter being configured, in cooperation with said controller, for
modulating received audio data with frequency modulation;
transmitting frequency modulated audio data on a frequency selected by said controller;
interrupting the transmitting of said frequency modulated audio data;
detecting if the frequency presently used for said transmitting is still available; and alternatively;
if the frequency presently used is still available, resuming said transmitting of said audio data on the frequency presently used;
or
if the frequency presently used is not available anymore selecting the at least one alternative frequency;
switching to said selected alternative frequency; and
resuming said transmitting of said audio data using said selected alternative frequency.

10. An apparatus according to claim 9, wherein said controller is further adapted for
controlling said receiver to repeat said scanning said frequency range to detect available radio frequencies; and
updating frequencies stored in said memory device accordingly if available frequencies have changed.

11. An apparatus according to claim 9, wherein said receiver and said transmitter are integrated into a transceiver unit.

12. An apparatus according to claim 9, further comprising:
an information interface for receiving information from said audio player device; and
a reformatting component adapted for reformatting said information into a format used by a program service name function, program type code function or radio text function of the radio data system;
wherein said transmitter is further adapted for transmitting reformatted information to be received by said radio data system capable radio receiver.

13. An apparatus according to claim 9, wherein said receiver is adapted to use a radio data system program identification code for detecting if a frequency is being used for licensed broadcast transmissions.

14. An audio player device, comprising an apparatus according to claim 9.

15. An apparatus according to claim 9, wherein said transmitter is further adapted for:
interrupting the transmitting of said frequency modulated audio data on said frequency selected by said controller;
selecting one of the at least one transmitted alternative frequency;
switching to said selected alternative frequency; and
resuming said transmitting of said frequency modulated audio data using said selected alternative frequency.

16. An apparatus according to claim 9, wherein said transmitter is further adapted for:
controlling said transmitter to transmit at least one of said stored frequencies as an alternative frequency of a radio data system as based on National Radio Systems Committee United States Radio Broadcast Data System (RBDS) Standard on said frequency selected by said controller to be received by a radio data system capable radio receiver.

* * * * *